(12) United States Patent
Ge et al.

(10) Patent No.: US 11,364,788 B2
(45) Date of Patent: Jun. 21, 2022

(54) HYBRID POWER VEHICLE, HYBRID POWER DRIVING SYSTEM AND GEAR BOX

(71) Applicant: SAIC MOTOR CORPORATION LIMITED, Shanghai (CN)

(72) Inventors: Hailong Ge, Shanghai (CN); Jun Zhu, Shanghai (CN); Jian Wang, Shanghai (CN); Bin Xu, Shanghai (CN); Yuchuan Fan, Shanghai (CN); Xinyu Liu, Shanghai (CN); Deyan Jiang, Shanghai (CN); Jian Zhou, Shanghai (CN); Jun Sun, Shanghai (CN); Zhengmin Gu, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 154 days.

(21) Appl. No.: 16/438,071

(22) Filed: Jun. 11, 2019

(65) Prior Publication Data
US 2020/0062105 A1 Feb. 27, 2020

(30) Foreign Application Priority Data

Apr. 12, 2018 (CN) .......................... 201810327598.3
Jan. 11, 2019 (CN) .......................... 201910027640.4

(51) Int. Cl.
*B60K 6/50* (2007.10)
*B60K 6/36* (2007.10)
(Continued)

(52) U.S. Cl.
CPC .................. *B60K 6/50* (2013.01); *B60K 6/36* (2013.01); *B60K 6/48* (2013.01); *B60W 10/10* (2013.01);
(Continued)

(58) Field of Classification Search
CPC .. F16H 3/093; F16H 61/70; F16H 2003/0822; F16H 2003/0931; B60K 6/36;
(Continued)

(56) References Cited

U.S. PATENT DOCUMENTS

| 2008/0234098 A1* | 9/2008 | Leufgen ................ B60W 10/04 477/5 |
| 2016/0084349 A1* | 3/2016 | Kim ........................ B60K 6/36 74/661 |

(Continued)

FOREIGN PATENT DOCUMENTS

| CN | 102039807 A | 5/2011 |
| CN | 202283873 U | 6/2012 |

(Continued)

OTHER PUBLICATIONS

China National Intellectual Property Administration, Office Action, CN Patent Application No. 201910027640.4, dated Feb. 2, 2021, 18 pages.

(Continued)

*Primary Examiner* — William C Joyce
(74) *Attorney, Agent, or Firm* — Fenwick & West LLP

(57) ABSTRACT

A gear box of a hybrid power vehicle includes a first gear box part and a second gear box part. The first gear box part includes one input shaft and two intermediate shafts, and the input shaft is configured to be connected to an internal combustion engine, a first driving toothed gear and a second driving toothed gear are provided on the input shaft, a first driven toothed gear and a second driven toothed gear are provided on a first intermediate shaft, a third driven toothed gear and a fourth driven toothed gear are provided on a second intermediate shaft; and the second gear box part includes a third intermediate shaft provided with a driving toothed gear of a first gear of the electric motor and the first (Continued)

or second intermediate shaft provided with a driven toothed gear of the first gear of the electric motor.

30 Claims, 6 Drawing Sheets

(51) Int. Cl.
*B60W 10/10* (2012.01)
*F16H 61/70* (2006.01)
*F16H 3/093* (2006.01)
*B60K 6/48* (2007.10)
*F16H 3/08* (2006.01)
*B60K 6/547* (2007.10)

(52) U.S. Cl.
CPC .............. *F16H 3/093* (2013.01); *F16H 61/70* (2013.01); *B60K 6/547* (2013.01); *B60K 2006/4808* (2013.01); *B60K 2006/4841* (2013.01); *F16H 2003/0822* (2013.01); *F16H 2003/0931* (2013.01); *F16H 2200/0047* (2013.01)

(58) Field of Classification Search
CPC . B60K 6/547; B60K 6/48; B60K 6/50; B60K 2200/0047
See application file for complete search history.

(56) References Cited

U.S. PATENT DOCUMENTS

| | | | |
|---|---|---|---|
| 2016/0089968 A1* | 3/2016 | Lee | B60K 6/48 74/665 L |
| 2016/0091057 A1 | 3/2016 | Choi | |
| 2016/0137189 A1 | 5/2016 | Zhu et al. | |
| 2016/0333967 A1* | 11/2016 | Park | B60K 6/547 |
| 2018/0015816 A1* | 1/2018 | Robinette | F16H 37/0806 |
| 2019/0210449 A1 | 7/2019 | Schulz et al. | |

FOREIGN PATENT DOCUMENTS

| | | |
|---|---|---|
| CN | 105620460 A | 6/2016 |
| CN | 107599818 A | 1/2018 |
| DE | 102016013477 A1 | 5/2017 |
| DE | 102017111710 A1 | 11/2017 |
| DE | 10 2017 220 071 * | 5/2019 |
| EP | 3061637 A1 | 8/2016 |
| JP | 2014-054900 A | 3/2014 |
| WO | WO 2018/010934 A1 | 1/2018 |
| WO | WO 2018/028747 A1 | 2/2018 |

OTHER PUBLICATIONS

European Patent Office, Extended European Search Report and Opinion, EP Patent Application No. 19179419.7, dated Jul. 12, 2021, ten pages.

* cited by examiner

HYBRID POWER VEHICLE, HYBRID POWER DRIVING SYSTEM AND GEAR BOX

CROSS REFERENCE OF RELATED APPLICATION

The application claims priority to Chinese patent application No. 201810327598.3 titled "VEHICLE AND HYBRID POWER DRIVING SYSTEM THEREOF," filed with the China National Intellectual Property Administration on Apr. 12, 2018, and Chinese patent application No. 201910027640.4 titled "HYBRID POWER VEHICLE, HYBRID POWER DRIVING SYSTEM AND GEAR BOX," filed with the China National Intellectual Property Administration on Jan. 11, 2019, each of which are incorporated herein by reference in its entirety.

FIELD

The present application relates to the technical field of vehicles, and specifically relates to a hybrid power vehicle, a hybrid power driving system and a gear box for the hybrid power vehicle.

BACKGROUND

A traditional vehicle industry uses fossil oil as fuel in the modern society. Although the traditional vehicle industry can provide a quick and comfortable means of transportation for people, it also increases the dependence of national energy on the fossil energy and deepens the contradiction between the energy production and consumption. With the constant increasing of double pressure of resources and environment, it is a trend for the future vehicle industry to develop new energy vehicles.

As a branch of the new energy vehicles, a hybrid power vehicle has several advantages of low emission pollution, long driving range, saving energy and keeping using the existing basic facilities, and thus is widely used. However, the power assembly of the conventional hybrid power vehicle has the disadvantages of occupying a large space, having a high cost of double electrical motors, a low efficiency of the cooperation between the internal combustion engine and the electric motor, and a poor fuel economy. Therefore, it is of a significant developing value to develop a hybrid power system of a superior overall performance by improving the structure of the power assembly of the hybrid power system.

A patent document No. CN107599818A describes a double clutch gear box, in which two input shafts are connected to the internal combustion engine by two clutches for transmission, and an electrical motor can output power using all gears of the original double clutch gear box. Such gear box has a complicated structure, and a complex cooperative operation between the internal combustion engine and the electric motor.

A patent document No. CN202283873U describes a transmission system for a hybrid electric vehicle, in which a first gear and a second gear of an internal combustion engine are omitted and replaced by gears of the electric motor. In this transmission system, the cooperative operation between the internal combustion engine and the electric motor is defective.

SUMMARY

An object of the present application is to provide a hybrid power vehicle, a hybrid power driving system and a gear box for the hybrid power vehicle, in which the gear box can be effectively downsized, and thus the space occupied by the hybrid power driving system including the gear box can be reduced, the cost thereof can also be reduced, and also the cooperating efficiency between the internal combustion engine and the electric motor can be improved.

According to a first aspect of the present application, a gear box used for a hybrid power vehicle is provided, wherein the gear box includes a first gear box part and a second gear box part, the first gear box part includes four forward gears, i.e. a first gear to a fourth gear, or includes fifth forward gears, i.e. a first gear to a fifth gear, and all the forward gears can be selectively switched on by selectively closing a plurality of synchronizers; the first gear box part includes just one input shaft and just two intermediate shafts, the input shaft is configured to be connected to an internal combustion engine for transmission, a first driving toothed gear and a second driving toothed gear are provided on the input shaft, a first driven toothed gear engageable with the first driving toothed gear and a second driven toothed gear engageable with the second driving toothed gear are provided on a first intermediate shaft of the two intermediate shafts, a third driven toothed gear engageable with the first driving toothed gear and a fourth driven toothed gear engageable with the second driving toothed gear are provided on a second intermediate shaft of the two intermediate shafts, the first to the fourth driven gears are respectively nested toothed gears and form one of the four forward gears of the five forward gears together with the respective driving toothed gears, in case of five forward gears, another gear other than the four gears is formed by a third driving toothed gear on the input shaft and a fifth driven toothed gear on the first intermediate shaft or the second intermediate shaft, a first main reduction toothed gear is provided on the first intermediate shaft, and a second main reduction toothed gear is provided on the second intermediate shaft, the first main reduction toothed gear and the second main reduction toothed gear are coupled with a common output shaft; and the second gear box part includes a third intermediate shaft and one intermediate shaft of the two intermediate shafts, the third intermediate shaft is configured to be connected to an electric motor, a driving toothed gear of a first gear of the electric motor is provided on the third intermediate shaft, and a driven toothed gear of the first gear of the electric motor is provided on the one intermediate shaft; and every two of the input shaft, the first intermediate shaft, the second intermediate shaft and the third intermediate shaft are parallelly staggered.

Optionally, the first driving toothed gear is a fixedly connected toothed gear or a nested toothed gear; and/or the second driving toothed gear is a fixedly connected toothed gear or a nested toothed gear.

Optionally, a synchronizer for the first driven toothed gear and a synchronizer for the second driven toothed gear form a first two-way synchronizer located on the first intermediate shaft between the first driven toothed gear and the second driven toothed gear; and/or a synchronizer for the third driven toothed gear and a synchronizer for the fourth driven toothed gear form a second two-way synchronizer located on the second intermediate shaft between the third driven toothed gear and the fourth driven toothed gear.

Optionally, the third driving toothed gear and the fifth driven toothed gear form five gears. As an alternative, the third driving toothed gear and the fifth driven toothed gear also can form the first gear, the second gear, the third gear, the fourth gear or the fifth gear.

Optionally, the first driving toothed gear and the second driven toothed gear form the first gear, the first driving toothed gear and the third driven toothed gear form the third gear, the second driving toothed gear and the second driven toothed gear form the second gear, and the second driving toothed gear and the fourth driven toothed gear forms the fourth gear.

Optionally, the first driving toothed gear and the second driving toothed gear are arranged in a listed sequence or in an inverted sequence on the input shaft from a side towards the internal combustion engine and a side away from the internal combustion engine; and the third driving toothed gear is arranged on a side towards the internal combustion engine or away from the internal combustion engine relative to the first driving toothed gear and the second driving toothed gear, or is arranged between the first driving toothed gear and the second driving toothed gear.

Optionally, the input shaft is configured to be connected to the internal combustion engine via a clutch or a hydraulic torque converter for transmission.

Optionally, a differential is integrated into the gear box, and the first main reduction toothed gear and the second main reduction toothed gear engage with a differential toothed gear of the differential; or the input shaft is configured to be connected to a main speed reducer and the differential via a transmission shaft for transmission.

Optionally, the electric motor is integrated into the gear box.

Optionally, the first gear box part has a reverse gear.

Optionally, the input shaft is provided with a reverse gear driving toothed gear, the first intermediate shaft and the second intermediate shaft is provided with a reverse gear driven toothed gear, and the reverse gear driving toothed gear is transmissively connected to the reverse driven gear via an intermediate toothed gear.

Optionally, the intermediate toothed gear is a driving toothed gear of a gear of the electric motor, and the reverse gear driven toothed gear is a driven toothed gear of the gear of the electric motor; or, the intermediate toothed gear is an idle toothed gear, and the reverse gear driven toothed gear is a driven toothed gear of the gear of the electric motor.

Optionally, the said gear of the electric motor is a first gear or a second gear of the electric motor.

Optionally, the third driving toothed gear is a nested toothed gear, the reverse gear driving toothed gear is a nested toothed gear, a synchronizer for the third driving toothed gear and a synchronizer for the reverse gear driving toothed gear form a third two-way synchronizer located on the input shaft between the third driving toothed gear and the reverse gear driving toothed gear.

Optionally, a driving toothed gear of a second gear of the electric motor is provided on the third intermediate shaft, and the one intermediate shaft is provided with a second driven toothed gear of the second gear of the electric motor.

Optionally, the driven toothed gear of the first gear of the electric motor and the second driven toothed gear of the second gear of the electric motor are respectively nested toothed gears, and a synchronizer for the driven toothed gear of the first gear of the electric motor and a synchronizer for the second driven toothed gear of the second gear of the electric motor form a fourth two-way synchronizer located on the said intermediate shaft between the driven toothed gear of the first gear of the electric motor and the second driven toothed gear of the second gear of the electric motor.

Optionally, with reference to an axis of the input shaft, one driving toothed gear of the gear of the electric motor and the third driving toothed gear are arranged on the same axial position.

Optionally, with reference to an axis of the input shaft, one driving toothed gear of the gear of the electric motor and the reverse gear driving toothed gear are arranged on the same axial position.

Optionally, with reference to an axis of the input shaft, the gear of the electric motor is arranged on a side towards the internal combustion engine, while the forward gears are arranged on a side away from the internal combustion engine; or, the forward gears are arranged on a side towards the internal combustion engine, and the gear of the electric motor is arranged on a side away from the internal combustion engine.

Optionally, the rotor shaft of the electric motor is parallel staggered relative to any one of the input shaft, the first intermediate shaft, the second intermediate shaft and the third intermediate shaft.

Optionally, the gear box is capable of operating in any of the following operating modes: internal combustion engine driving mode, wherein only the input shaft is driven by the internal combustion engine; pure electric mode, wherein only one electric gear is driven by the electric motor; hybrid drive mode, wherein not only the input shaft is driven by the internal combustion engine, but also one electric gear is driven by the electric motor; charging mode, wherein the electric motor is driven by the input shaft; internal combustion engine starting mode, wherein the input shaft is driven by the electric motor; and reverse gear mode, including a reverse gear mode simply by the internal combustion engine, a reverse gear mode simply by the electric motor, and a hybrid gear mode by both the internal combustion engine and the electric motor.

Optionally, the hybrid drive mode is achieved by any forward gear and any gear of the electric motor.

Optionally, the charging mode includes: an idle charging operating mode, wherein a power transmission path from the input shaft to the electric motor includes a reverse gear driving toothed gear and a driving toothed gear of one gear of the electric motor; and a driving charging operating mode, wherein the power transmission path from the input shaft to the electric motor includes a driving toothed gear and a driven toothed gear of one forward gear, the first main reduction toothed gear and the second main reduction toothed gear, and a driven toothed gear and a driving toothed gear of one gear of the electric motor.

Optionally, the driving toothed gear of the first gear and the third gear as the first driving toothed gear and the driving toothed gear of the second gear and the fourth gear as the second driving toothed gear are fixedly arranged in a listed sequence from a side of the input shaft towards the internal combustion engine to a side of the input shaft away from the internal combustion engine; the first main reduction toothed gear, the driven toothed gear of the first gear as the first driven toothed gear, a first two-way synchronizer and the driven toothed gear of the second gear as the second driven toothed gear are arranged in a listed sequence from a side of the first intermediate shaft towards the internal combustion engine to a side of the first intermediate shaft away from the internal combustion engine; the second main reduction toothed gear, the driven toothed gear of the third gear as the third driven toothed gear, a second two-way synchronizer, the driven toothed gear of the fourth gear as the fourth driven toothed gear and the driven toothed gear of the first gear of the electric motor are arranged in a listed sequence from a side of the second intermediate shaft towards the internal combustion engine to a side of the second intermediate shaft away from the internal combustion engine; the third intermediate shaft is connected to the electric motor for transmission, and is provided with the driving toothed gear of the first gear; and the output shaft is provided with a differential, a differential toothed gear of the differential engages with the first main reduction toothed gear and the second main reduction toothed gear respectively.

Optionally, the input shaft is further provided with a first synchronizer and a reverse gear driving toothed gear, the first synchronizer is engageable with the reverse gear driving toothed gear, which engages with the driving toothed gear of the first gear of the electric motor.

Optionally, the gear box further includes an idle toothed gear shaft of the reverse gear and an idle toothed gear provided on the idle toothed gear shaft of the reverse gear, and the input shaft is further provided with the first synchronizer and the reverse gear driving toothed gear; and the idle toothed gear engages with the reverse gear driving toothed gear and the driven toothed gear of the first gear of the electric motor respectively.

Optionally, the input shaft is further provided with a driving toothed gear of the fifth gear as the third driving toothed gear, the first synchronizer is a component of a third two-way synchronizer, which can engage with the driving toothed gear of the fifth gear or the reverse gear driving toothed gear; and the first intermediate shaft or the second intermediate shaft is provided with a driven toothed gear of the fifth gear as the fifth driven toothed gear fitted with the driving toothed gear of the fifth gear.

Optionally, the driven toothed gear of the first gear of the electric motor is a fixedly connected toothed gear fixedly arranged on the second intermediate shaft; and the driven toothed gear of the first gear of the electric motor is a nested toothed gear sleeved on the second intermediate shaft, and the second intermediate shaft is provided with a second synchronizer for the driven toothed gear of the first gear.

Optionally, the third intermediate shaft is further provided with a driving toothed gear of the second gear of the electric motor, and the second intermediate shaft is provided with a driven toothed gear of the second gear of the electric motor of the nested gear; and the second synchronizer is a component of the fourth two-way synchronizer, and the fourth two-way synchronizer is located between the driven toothed gear of the first gear and the driven toothed gear of the second gear of the electric motor.

Optionally, the third intermediate shaft is connected to the electric motor by a gear wheel or a chain wheel for transmission.

In a further implementation, the gear box has following technical features. The reverse gear driving toothed gear formed as the nested toothed gear, a third two-way synchronizer, a driving toothed gear of the fifth gear formed as the nested toothed gear as the third driving toothed gear, a driving toothed gear of the first gear and the third gear as the first driving toothed gear, and a driving toothed gear of the second gear and the fourth gear as the second driving toothed gear are arranged in a listed sequence from a side of the input shaft towards the internal combustion engine to a side of the input shaft away from the internal combustion engine; a first main reduction toothed gear, a driven toothed gear of the second gear of the electric motor, a driven toothed gear of the second gear, a fourth two-way synchronizer, a driven toothed gear of the second gear of the electric motor, a driven toothed gear of the first gear as the first driven toothed gear, a first two-way synchronizer, and a driven toothed gear of the second gear as the second driven toothed gear are arranged in a listed sequence from a side of the first intermediate shaft towards the internal combustion engine to a side of the first intermediate shaft away from the internal combustion engine; the second main reduction toothed gear, a driven toothed gear of the fifth gear as the fifth driven toothed gear, a driven toothed gear of the third gear as the third driven toothed gear, a second two-way synchronizer and a driven toothed gear of the fourth gear of the electric motor as the fourth driven toothed gear are arranged in a listed sequence from a side of the second intermediate shaft towards the internal combustion engine to a side of the second intermediate shaft away from the internal combustion engine; the third intermediate shaft is connected to the electric motor for transmission, and is provided with the driving toothed gear of the first gear of the electric motor and the driving toothed gear of the first gear in a listed sequence from a side of the third intermediate shaft towards the internal combustion engine to a side of the third intermediate shaft away from the internal combustion engine; and the output shaft is provided with a differential, a differential toothed gear of the differential can engage with the first main reduction toothed gear and the second main reduction toothed gear.

According to a second aspect of the present application, a hybrid power driving system is provided, which includes an internal combustion engine and an electric motor, wherein the hybrid power driving system further includes the gear box according to the first aspect of the present application.

According to a third aspect of the present application, a hybrid power drive vehicle is provided, including the hybrid power driving system as described above.

In a solution, in order to solve the above technical issues, the hybrid power driving system is provided, which includes an internal combustion engine, an electric motor, and a gear box. The gear box includes an input shaft, a first intermediate shaft, a second intermediate shaft, a third intermediate shaft and an output shaft which are arranged in parallel. The input shaft is connected to the internal combustion engine by a clutch. The driving toothed gear of the first gear and the third gear and the driving toothed gear of the second gear and the fourth gear are fixedly arranged in a listed sequence from a side of the input shaft towards the internal combustion engine to a side of the input shaft away from the internal combustion engine. The first main reduction toothed gear, the driven toothed gear of the first gear, the first two-way synchronizer and the driven toothed gear of the second gear are arranged in a listed sequence from a side of the first intermediate shaft towards the internal combustion engine to a side of the first intermediate shaft away from the internal combustion engine. The second main reduction toothed gear, the driven toothed gear of the third gear, the second two-way synchronizer, the driven toothed gear of the fourth gear and the driven toothed gear of the first gear of the electric motor are arranged in a listed sequence from a side of the second intermediate shaft towards the internal combustion engine to a side of the second intermediate shaft away from the internal combustion engine. The third intermediate shaft is connected to the electric motor for transmission, and is provided with the driving toothed gear of the first gear. The output shaft is provided with a differential, a differential toothed gear of the differential can engage with the first main reduction toothed gear and the second main reduction toothed gear.

Optionally, the first synchronizer and the reverse gear driving toothed gear are provided on the input shaft, the first synchronizer can engage with the reverse gear driving toothed gear, and the reverse gear driving toothed gear can engage with the driving toothed gear of the first gear of the electric motor.

Optionally, the gear box further includes a reverse gear idle toothed gear shaft and an idle toothed gear arranged on the reverse gear idle toothed gear shaft, and the first synchronizer and the reverse gear driving toothed gear are provided on the input shaft, the idle toothed gear engages with the reverse gear driving toothed gear and the driven toothed gear of the first gear of the electric motor respectively.

Optionally, the input shaft may further be provided with a driving toothed gear of a fifth gear. The first synchronizer is a component of a third two-way synchronizer, and the third two-way synchronizer can engage with the driving toothed gear of the fifth gear or the reverse gear driving toothed gear selectively. A driven toothed gear of the fifth gear fitting with the driving toothed gear of the fifth gear is provided on the first intermediate shaft or the second intermediate shaft.

Optionally, the driven toothed gear of the first gear of the electric motor is a fixedly connected toothed gear fixed on the second intermediate shaft.

Optionally, the driven toothed gear of the first gear of the electric motor is a nested toothed gear sleeved on the second intermediate shaft, and the second intermediate shaft is further provided with a second synchronizer fixedly connected to the nested toothed gear.

Optionally, a driving toothed gear of a second gear of the electric motor is arranged on the third intermediate shaft, and a driven toothed gear of a second gear of the electric motor is arranged on the second intermediate shaft. The second synchronizer is a component of a fourth two-way synchronizer, which is located between the driven toothed gear of the first gear of the electric motor and the driven toothed gear of the second gear of the electric motor.

Optionally, the third intermediate shaft is connected to the electric motor by a toothed gear or a chain for transmission.

In the hybrid power vehicle the hybrid power driving system according to the present application, by designing the structure and configuration of the gears, the gear box and the hybrid power system have a simple and compact structure; by different power transmission paths of the gears, the requirements of pure internal combustion engine driving, pure electric driving and hybrid driving can be met; by the cooperation between the gears of the internal combustion engine and the electric motor and reasonably inputting and distributing the power of double source, the power performance and the fuel economy of the whole vehicle can be improved; and by the alternative operating of the electric motor and the internal combustion engine and the opening and closing control of the clutch, the power interruption problem during gear changing of the automatic gear box can be completely resolved.

BRIEF DESCRIPTION OF THE DRAWINGS

For making those skilled in the field better understand the technical solutions of the present application, the present application is further described in details in conjunction with the drawings and embodiments hereinafter.

DETAILED DESCRIPTION

Figure 1:
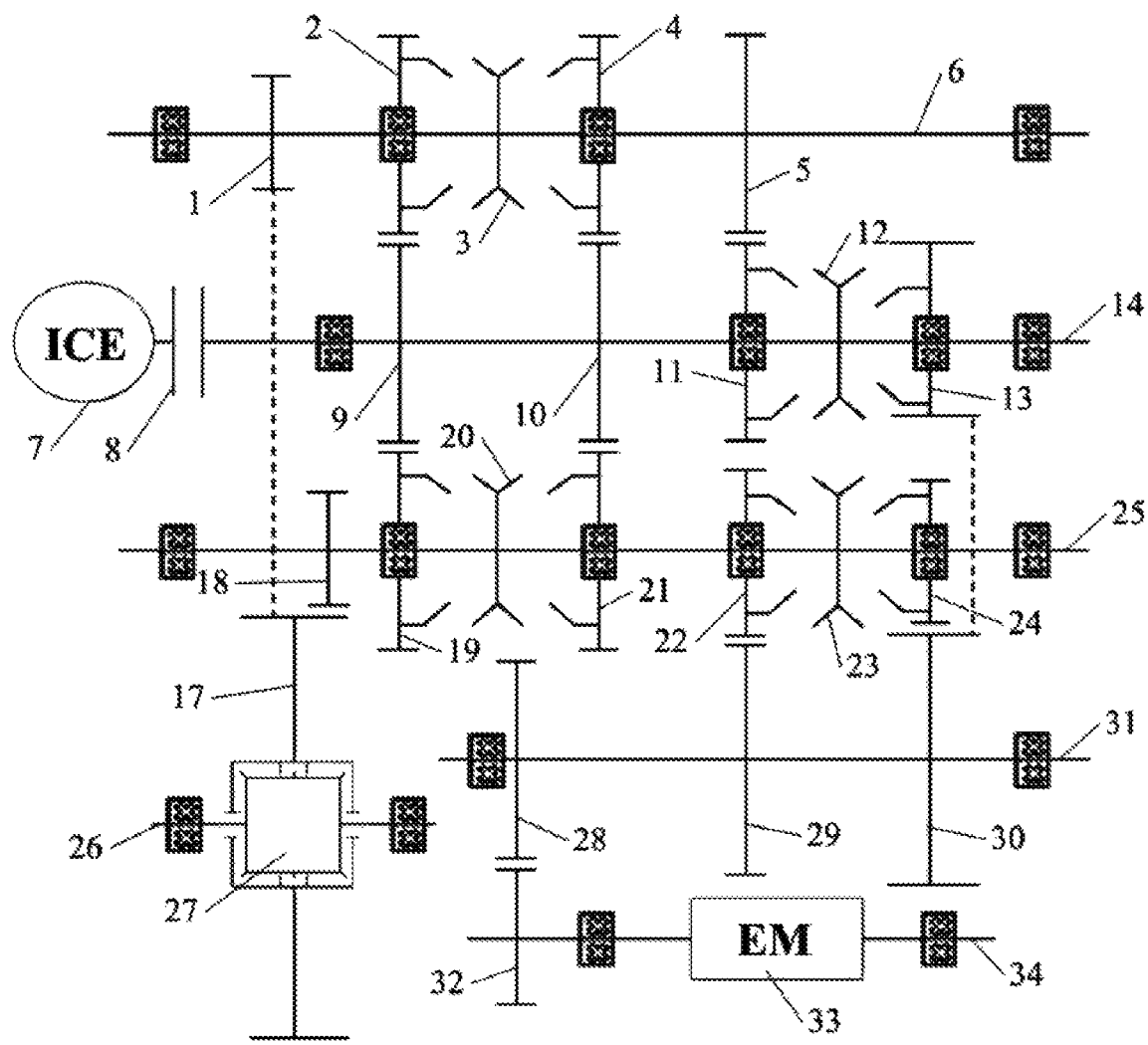
FIG. 1 is a schematic view of the structure of a hybrid power driving system for a vehicle according to a first embodiment of the present application.

FIG. 1 is a schematic view of the structure of a hybrid power driving system for a vehicle according to a first embodiment of the present application. The hybrid power driving system includes an internal combustion engine (ICE) or an engine 7, an electric motor (EM) 33 and a gear box. The internal combustion engine 7 may be connected to an input shaft 14 of the gear box for transmission, for example may be connected to the input shaft 14 by a single clutch 8 or a hydraulic torque converter which is not shown for transmission. When necessary, a torsional vibration damper may be arranged between the internal combustion engine 7 and the input shaft 14. The electric motor 33 may be integrated with the gear box, or, the electric motor 33, as a single module, may also be installed on a housing of the gear box.

The gear box for the hybrid power vehicle shown in FIG. 1 includes a first gear box part and a second gear box part. The first gear box part includes five forward gears i.e. a first gear to a fifth gear, and each forward gear can be selectively switched on by selectively closing multiple synchronizers.

Herein, the first gear box part includes just one input shaft 14 and just two intermediate shafts 6 and 25. The input shaft 14 is arranged to be connected to the internal combustion engine 7 for transmission. One first driving toothed gear 9, one second driving toothed gear 10 and one third driving toothed gear 11 are provided on the input shaft 14. One first driven toothed gear 2 engaging with the first driving toothed gear 9, one second driven toothed gear 4 engaging with the second driving toothed gear 10 and one fifth driven toothed gear engaging with the third driving toothed gear 11 are provided on a first intermediate shaft 6. One third driven toothed gear 19 engaging with the first driving toothed gear 9 and one fourth driven toothed gear 21 engaging with the second driving toothed gear 10 are provided on a second intermediate shaft 25. The first driven toothed gear to the fourth driven toothed gear 2, 4, 19 and 21 respectively constitute as nested gears. The first driven toothed gear to the fourth driven toothed gear 2, 4, 19 and 21 together with respective driving toothed gears form one of the five forward gears, and the third driving toothed gear 11 and the fifth driven toothed gear 5 form another forward gear.

In the embodiment shown in FIG. 1, the first driving toothed gear 9 and the first driven toothed gear 2 form a first gear, the first driving toothed gear 9 and the third driven toothed gear 19 form a third gear, the second driving toothed gear 10 and the second driven toothed gear 4 form a second gear, the second driving toothed gear 10 and the forth driven toothed gear 21 form a fourth gear, and the third driving toothed gear 11 and the fifth driven toothed gear 5 form a fifth gear. Herein, the first driving toothed gear 9 may be referred to as a driving toothed gear of the first gear and the third gear, the second driving toothed gear 10 may be referred to as a driving toothed gear of the second gear and the fourth gear, and the third driving toothed gear may be referred to as a driving toothed gear of the fifth gear.

In principle, the forward gears of the first gear box part may be combined randomly. For example, it is also possible that the first driving toothed gear 9 and the first driven toothed gear 2 form the first gear and the first driving toothed gear 9 and the third driven toothed gear 19 form the fifth gear, the second driving toothed gear 10 and the second driven toothed gear 4 form the second gear and the second driving toothed gear 10 and the fourth driven toothed gear 21 form the fourth gear, and the third driving toothed gear 11 and the fifth driven toothed gear 5 form the third gear.

Herein, an arrangement order of the driving toothed gears 9, 10 and 11 on the input shaft 14 can be selected according to the requirements. For example, it is also possible that axial positions of the first driving toothed gear 9, the first driven toothed gear 2 and the third driven toothed gear 19 may be exchanged with those of the second driving toothed gear 10, the second driven toothed gear 4 and the fourth driven toothed gear 21; it is also possible that the third driving toothed gear 11 and the fifth driven toothed gear 5 are arranged between the first driving toothed gear 9 and the second driving toothed gear 10 in an axial direction.

In FIG. 1, the first driving toothed gear 9 and the second driving toothed gear 10 are respectively fixedly connected toothed gears. Alternatively, it is also possible that one of or both of the first driving toothed gear 9 and the second driving toothed gear 10 may be a nested toothed gear, thus both driving toothed gears 9 and 10 would not be always driven simultaneously when driven by the internal combustion engine.

In FIG. 1, multiple toothed gears constitute as nested toothed gears. The nested toothed gears may be each provided with a synchronizer, which can make the nested toothed gears to be connected to the corresponding shafts without relative rotation during engagement. The synchronizer may be understood as a switch element having an open state and a close state. In the open state, the nested toothed gears can rotate relative to their corresponding shafts, and in the close state, the nested toothed gears are connected to their corresponding shafts without relative rotation and thus are rotated together. The synchronizer, such as, may be switch elements locked by friction or by a shape. Two adjacent synchronizers may be combined into a two-way synchronizer, which thus makes the synchronizers and the corresponding operation mechanisms simplified in structure and reduced in number.

The first gear box part may include at least one reverse gear and just one reverse gear. For this, in the embodiment in FIG. 1, a reverse gear driving toothed gear 13 is provided on the input shaft 14, a reverse gear driven toothed gear is provided on the second intermediate shaft, and the reverse gear driving toothed gear 13 is connected to the reverse gear driven toothed gear via an intermediate toothed gear for transmission. Herein, a driven toothed gear 24 of the first gear of the electric motor is used as the reverse gear driving toothed gear, and a driving toothed gear 30 of the first gear of the electric motor is used as the intermediate toothed gear. As an alternative, it is also possible that a single reverse gear driven toothed gear and a single intermediate toothed gear are provide. For example, the single reverse gear driven toothed gear may be arranged on the first intermediate shaft 6. In FIG. 1, the engagement between the reverse gear driving toothed gear 13 and the driving toothed gear 30 of the first gear of the electric motor is schematically shown by a dotted line.

In FIG. 1, a first main reduction toothed gear 1 is provided on the first intermediate shaft 6, and a second main reduction toothed gear 18 is provided on the second intermediate shaft 25. The first main reduction toothed gear 1 and the second main reduction toothed gear 18 are coupled with a common output shaft 26 and more specifically are coupled with a differential toothed gear 17 of a differential 27 (which is schematically shown by a dotted line in FIG. 1). The output shaft 26 includes two half shafts. Herein, the differential 27 is integrated into the gear box or is permanently connected to the gear box. As an alternative, it is also possible that the differential 27 is a single module, and the output shaft of the gear box is connected to the differential via a transmission shaft for transmission, and the toothed gears on the output shaft engage with the two main reduction toothed gears 1 and 18. Herein, the main reduction toothed gears 1 and 18 are arranged on a side of the corresponding intermediate shafts toward the internal combustion engine 7. In principle, the main reduction toothed gears may be arranged on any axial position, such as may be arranged on a side of the corresponding intermediate shafts away from the internal combustion engine.

The second gear box part includes a third intermediate shaft 31 and one of the two intermediate shafts 6 and 25 (herein is the second intermediate shaft 25). The third intermediate shaft 31 is configured to be connected to the electric motor 33 for transmission, and the gear box may include one or more gears of the electric motor. In the embodiment in FIG. 1, there are two gears of the electric motor, specifically a driving toothed gear 30 of a first gear of the electric motor and a driving toothed gear 29 of a second gear of the electric motor are arranged on the third intermediate shaft 31, and a driven toothed gear 24 of a first gear of the electric motor and a driven toothed gear 22 of a second gear of the electric motor are arranged on the second intermediate shaft 25. Herein, the driven toothed gear 24 of the first gear of the electric motor and the driven toothed gear 22 of the second gear of the electric motor are respectively configured as nested toothed gears, and are fitted with a two-way synchronizer 23. The driving toothed gear 30 of the first gear of the electric motor and the driving toothed gear 29 of the second gear of the electric motor are respectively configured as fixedly connected toothed gears. As an alternative, it is possible that one or both of the driving toothed gear 30 of the first gear of the electric motor and the driving toothed gear 29 of the second gear of the electric motor is configured as the nested toothed gear and is fitted with a corresponding synchronizer. The axial order of the gears for the electric motor may be random.

In one embodiment, the driving toothed gear 30 of the first gear of the electric motor is configured as a nested toothed gear, thus when the reverse gear driving toothed gear 13 forms a reverse gear with the driven toothed gear 24 of the first gear of the electric motor or the reverse gear driven toothed gear, the electric motor 44 is not driven by the reverse gear driving toothed gear 13. In case of a hybrid reverse gear, the synchronizer of the driving toothed gear 30 of the first gear of the electric motor is engaged, the electric motor rotates reversely and also drives the driven toothed gear 24 of the first gear of the electric motor or the reverse gear driven toothed gear so as to provide an additional moment of force for the reverse gear.

In FIG. 1, every two of the input shaft 14, the first intermediate shaft 6, the second intermediate shaft 25, the third intermediate shaft 31 and a rotor shaft of the electric motor are parallelly staggered. The electric motor 33 is connected to the third intermediate shaft 31 by a first transmission gear 32 and a second transmission gear 28 for transmission. As an alternative, a rotor shaft 34 of the electric motor 33 may also be connected to the third intermediate shaft by chain transmission, belt transmission or other transmission ways for transmission. For example, in the case that the electric motor has an integrated speed reduction mechanism, an output shaft of the electric motor 33 may also be co-axial with the third intermediate shaft 31.

In FIG. 1, the synchronizer for the first driven toothed gear 2 and the synchronizer for the second driven toothed gear 4 constitute a first two-way synchronizer 3 on the first intermediate shaft 6 between the first driven toothed gear 2 and the second driven toothed gear 4. The synchronizer for the third driven toothed gear 19 and the synchronizer for the fourth driven toothed gear 21 constitute a second two-way synchronizer 20 on the second intermediate shaft 25 between the third driven toothed gear 19 and the fourth driven toothed gear 21. The synchronizer for the third driving toothed gear 11 and the synchronizer for the reverse gear driving toothed gear 13 constitute a third two-way synchronizer 12 on the input shaft 14 between the third driving toothed gear 11 and the reverse gear driving toothed gear 13. The synchronizer for the driven toothed gear 24 of the first gear of the electric motor and the synchronizer for the driven toothed gear 22 of the second gear of the electric motor constitute a fourth two-way synchronizer 23 on the second intermediate shaft between the driven toothed gear 24 of the first gear of the electric motor and the driven toothed gear 22 of the second gear of the electric motor. The arrangement structure in FIG. 1 can achieve a very compact gear box.

Moreover, one of two gears for the electric motor (herein is the second gear for the electric motor) has the same axial position as the third driving toothed gear 11, and the other of two gears for the electric motor (herein is the first gear for the electric motor) has the same axial position as the reverse gear driving toothed gear. Therefore, the structure of the gear box can be more compact.

In an embodiment which is not described, the third driving toothed gear 11 and the reverse gear driving toothed gear 13 in FIG. 1 may be replaced by a common driving toothed gear, and the fifth driven toothed gear 5 and a middle toothed gear (herein is the driving toothed gear 30 of the first gear of the electric motor) engage with this common toothed gear, and the fifth driven toothed gear 5 is changed into a nested toothed gear from a fixedly connected toothed gear.

The embodiments in FIGS. 2 to 5 are similar to the embodiment in FIG. 1, and the main differences between them are illustrated hereinafter. By referring to the detailed description of the embodiment in FIG. 1, the embodiments in FIGS. 2 to 5 are easily understood with reference to corresponding drawings.

Figure 2:
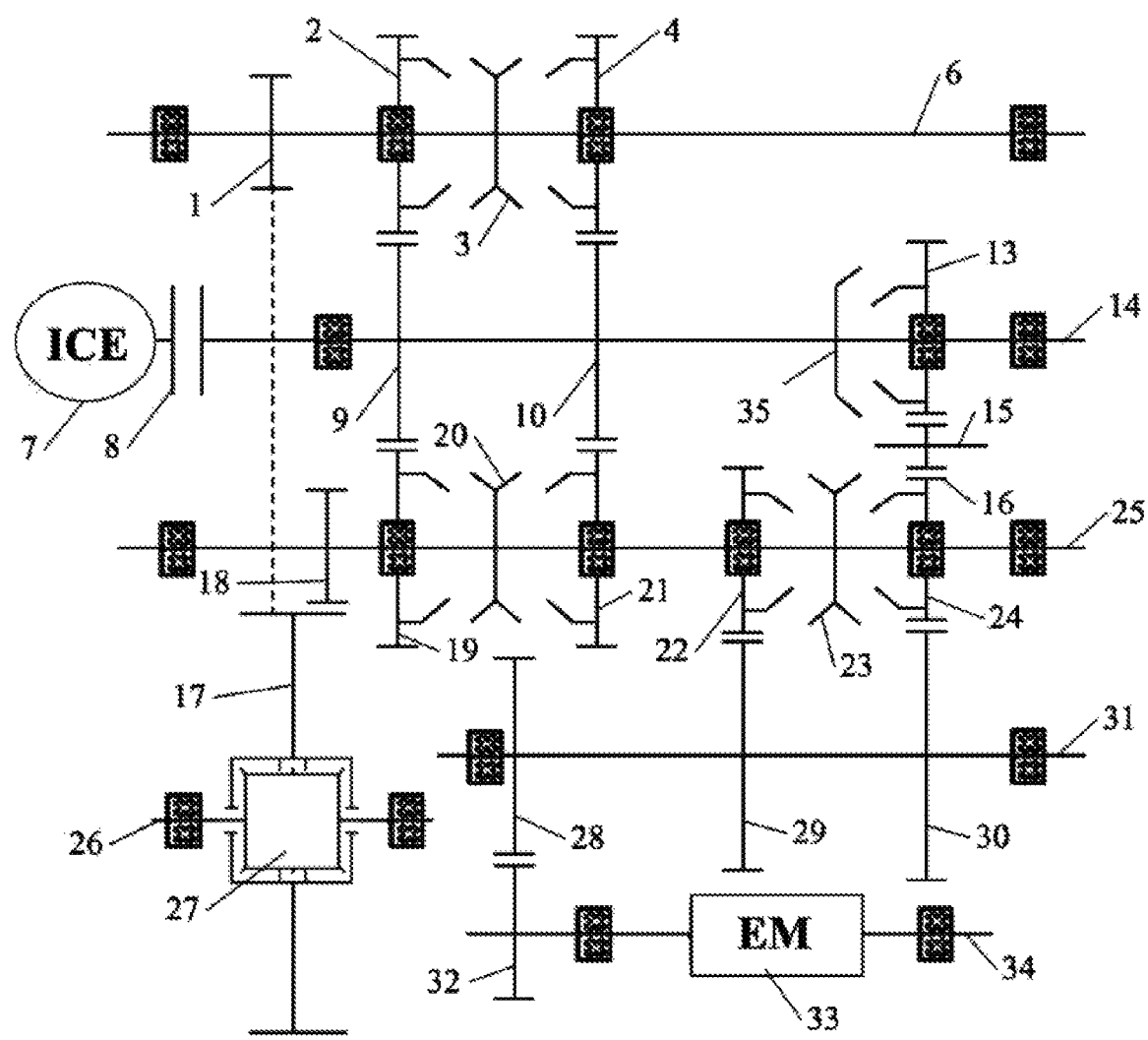
FIG. 2 is a schematic view of the structure of a hybrid power driving system for a vehicle according to a second embodiment of the present application.

FIG. 2 is a schematic view of the structure of a hybrid power driving system for a vehicle according to a second embodiment of the present application. The main difference between the embodiment in FIG. 2 and the embodiment in FIG. 1 is that the gear box in FIG. 1 has the fifth gear while the gear box in FIG. 2 does not have the fifth gear. Other aspects may refer to the above description. Herein, the reverse gear driven toothed gear is achieved by the driven toothed gear 24 of the first gear of the electric motor. As an alternative, the reverse gear driven toothed gear may also be achieved by the driven toothed gear 22 of the second gear of the electric motor.

Figure 3:
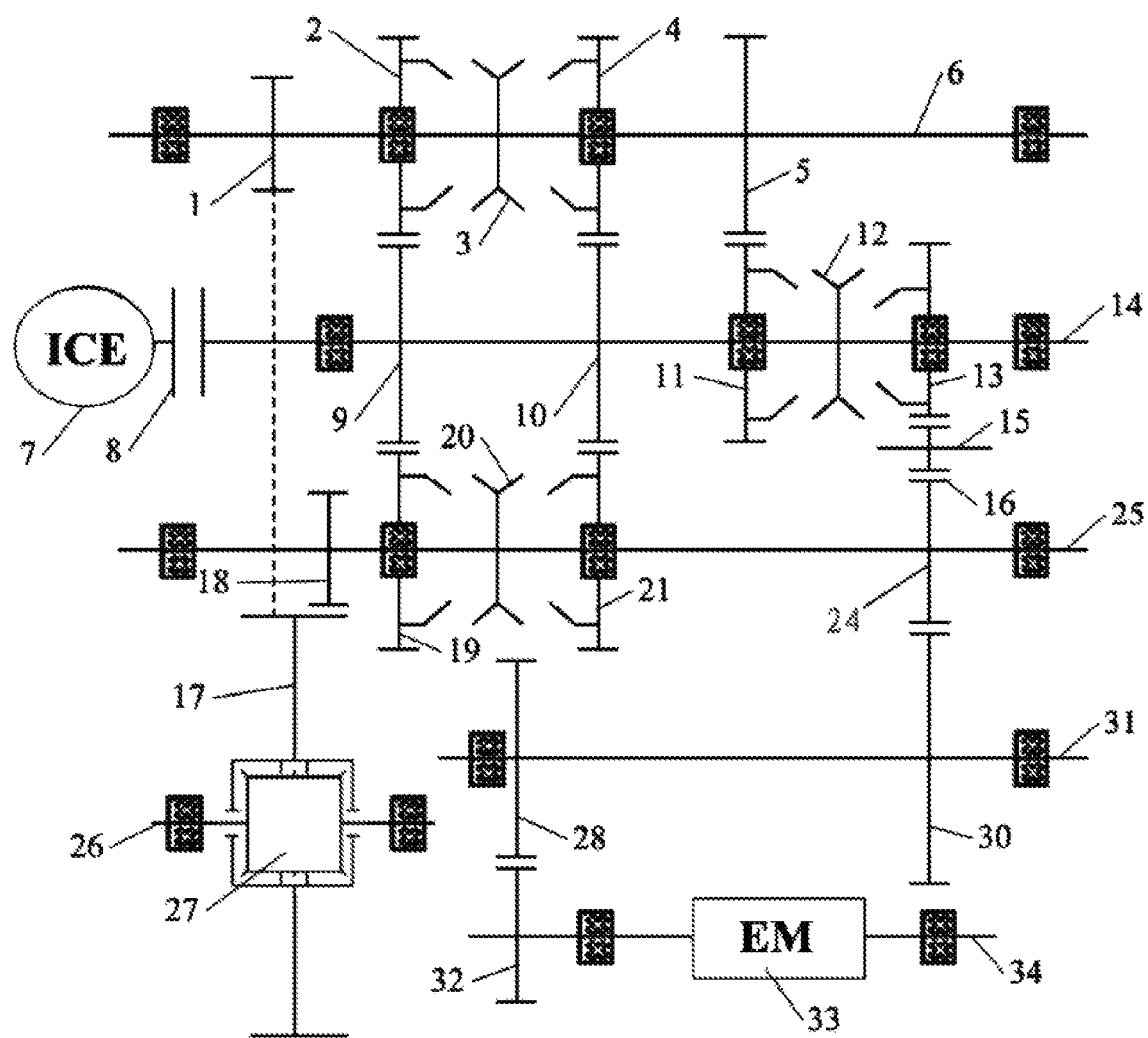
FIG. 3 is a schematic view of the structure of a hybrid power driving system for a vehicle according to a third embodiment of the present application.

FIG. 3 is a schematic view of the structure of a hybrid power driving system for a vehicle according to a third embodiment of the present application. The main difference between the embodiment in FIG. 3 and the embodiment in FIG. 1 is that the gear box in FIG. 1 has two gears of the electric motor while the gear box in FIG. 3 has just one gear of the electric motor; and the implementation mode of the first gear box part is different. In FIG. 3, a reverse middle toothed gear and the reverse gear driven toothed gear are achieved by an idle toothed gear 16 and the driven toothed gear 24 of the first gear of the electric motor.

In the embodiment in FIG. 3, the driving toothed gear 30 of the first gear of the electric motor and the driven toothed gear 24 of the first gear of the electric motor are respectively fixedly connected toothed gears. As an alternative, it is also possible that one or both of the driving toothed gear 30 of the first gear of the electric motor and the driven toothed gear 24 of the first gear of the electric motor is nested toothed gear.

Figure 4:
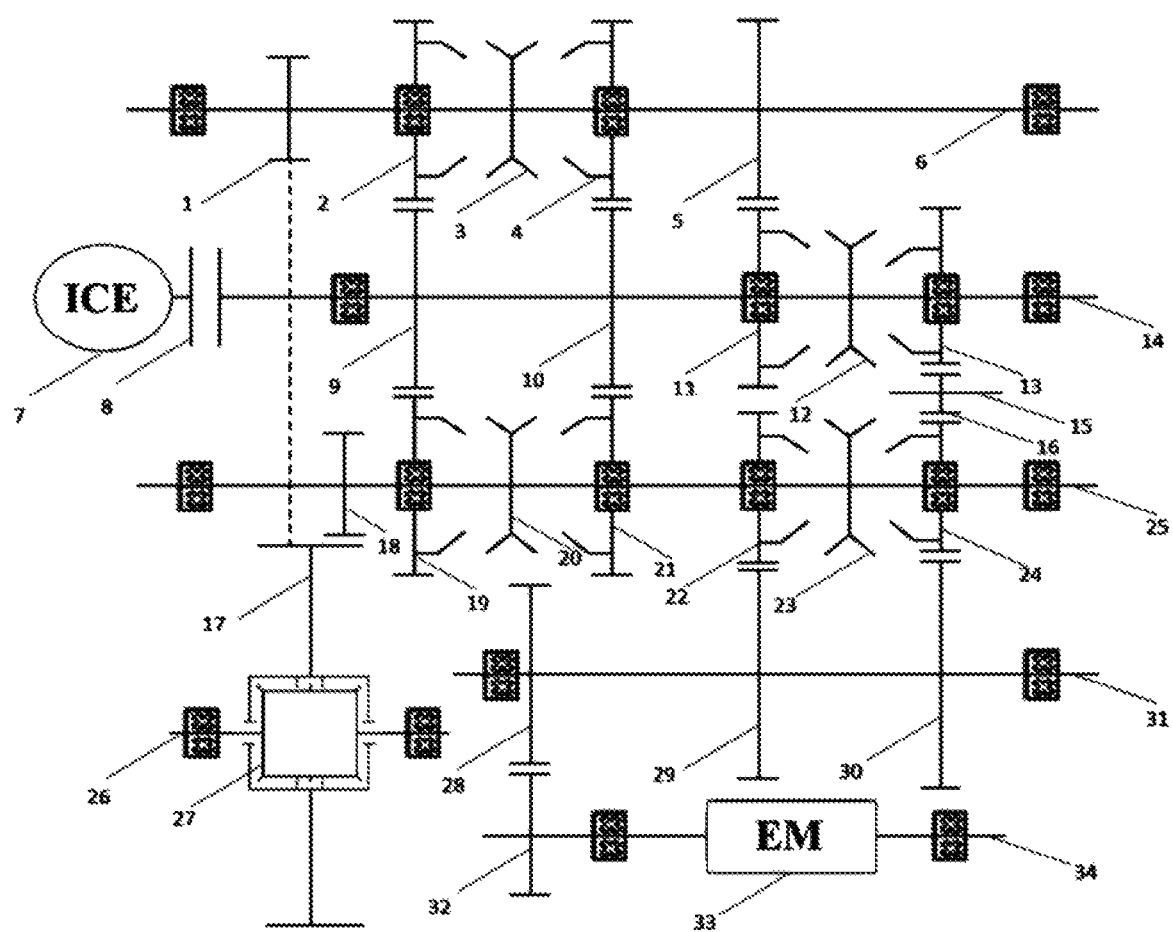
FIG. 4 is a schematic view of the structure of a hybrid power driving system for a vehicle according to a fourth embodiment of the present application.

FIG. 4 is a schematic view of the structure of a hybrid power driving system for a vehicle according to a fourth embodiment of the present application. The main difference between the embodiment in FIG. 4 and the embodiment in FIG. 1 is that the implementation mode of the reverse gear of the first gear box part is different. In FIG. 4, the middle toothed gear of reverse gear and the reverse gear driven toothed gear are achieved by the idle toothed gear 16 and the driven toothed gear 24 of the first gear of the electric motor.

Figure 5:
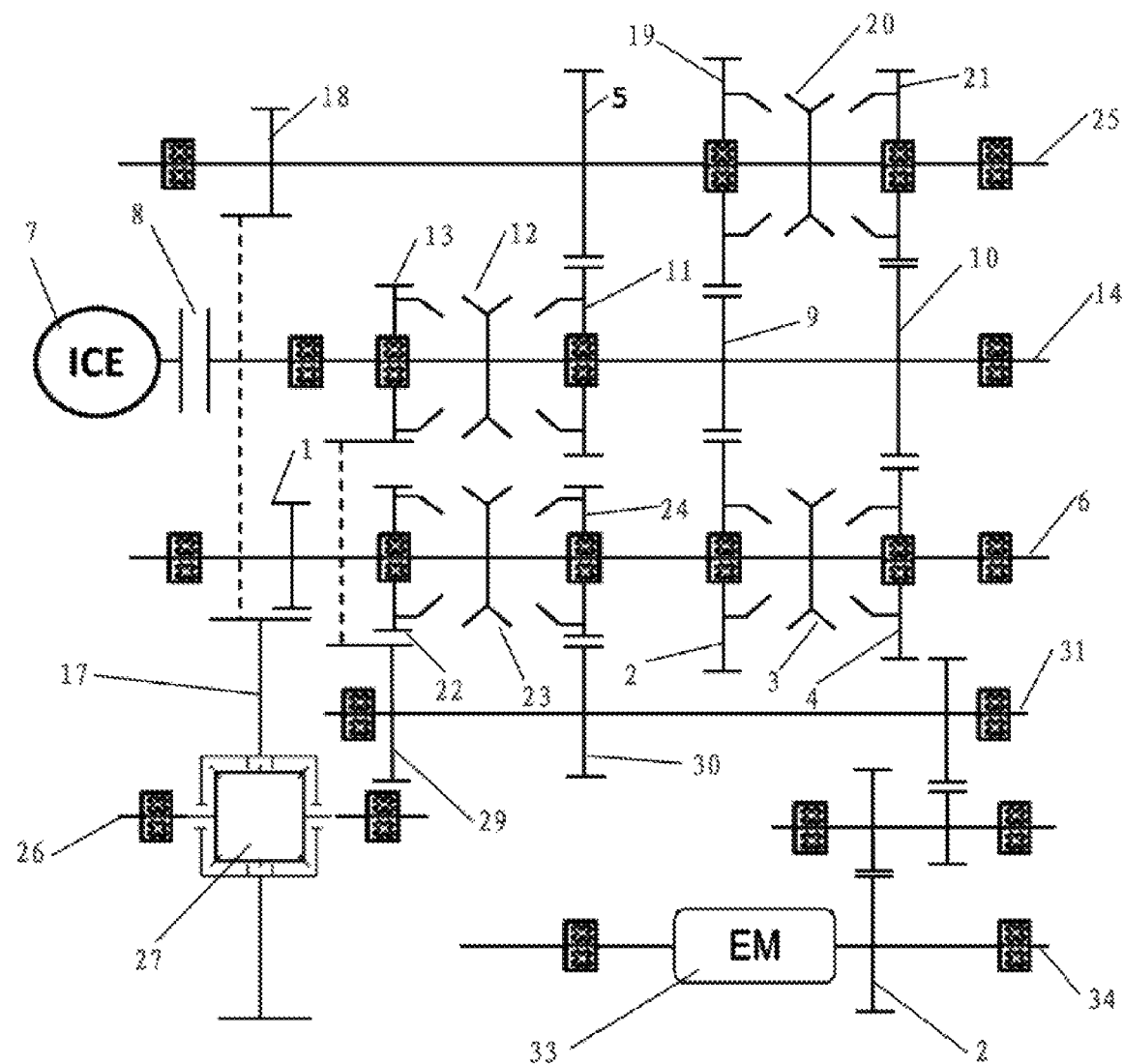
FIG. 5 is a schematic view of the structure of a hybrid power driving system for a vehicle according to a fifth embodiment of the present application.

FIG. 5 is a schematic view of the structure of a hybrid power driving system for a vehicle according to a fifth embodiment of the present application. The main difference between the embodiment in FIG. 5 and the embodiment in FIG. 1 is that the arrangement order of all the gears of the gear box is different. In FIG. 5, referring to the axis of the input shaft 14, the reverse gear driving toothed gear 13, the third driving toothed gear 11, the first driving toothed gear 9 and the second driving toothed gear 10 are arranged in a listed sequence from a side towards the internal combustion engine 7 to a side away from the internal combustion engine 7. The axial positions of the driven toothed gears on the first intermediate shaft 6 and the second intermediate shaft 25 are varied accordingly. The second gear of the electric motor and the reverse gear driving toothed gear 13 have the same axial position, and the driving toothed gear 29 of the second gear of the electric motor forms the intermediate toothed gear, and the driven toothed gear 22 of the second gear of the electric motor forms the reverse gar driven toothed gear. The first gear and the third driving toothed gear 11 have the same axial position. Herein, the second gear box part includes the first intermediate shaft, and on the contrary, in the embodiments shown in FIGS. 1 to 4, the second gear box part includes the second intermediate shaft. In a varied solution, the axial positions of the first gear of the electric motor and the second gear of the electric motor may be interchanged, therefore the reverse gear driving toothed gear 13 and the first gear of the electric motor are combined, and the second gear of the electric motor and the third driving toothed gear 11 are located at the same axial position.

It should be noted herein that, the technical features of the embodiments in the present application can be inter-combined, as long as the combinations are not mutually contradictory.

The gear box according to the present application can operate in any one operating mode of the following operating modes: internal combustion engine driving mode, in which only the input shaft 14 is driven by the internal combustion engine 7; pure electric mode, in which only one electric gear is driven by the electric motor 33; hybrid driving mode, in which not only the input shaft 14 is driven by the internal combustion engine, but also one electric gear is driven by the electric motor 33, and the hybrid driven mode can be achieved by any forward gear and any gear of the electric motor; charging mode, in which the electric motor is driven by the input shaft 14, and preferably, the charging mode includes idling charging mode and driving charging mode; internal combustion engine starting mode, in which the input shaft 14 is driven by the electric motor 33; and reverse gear mode, including a reverse gear mode simply by the internal combustion engine, a reverse gear mode simply by the electric motor, and a hybrid gear mode by both the internal combustion engine and the electric motor.

In one embodiment, a hybrid power driving system and a hybrid power vehicle including the hybrid power driving system are provided. The hybrid power driving system includes an internal combustion engine 7, an electric motor 33 and a gear box. The gear box includes an input shaft 14, a first intermediate shaft 6, a second intermediate shaft 25, a third intermediate shaft 31 and an output shaft 26 which are arranged in parallel. The input shaft 14 is connected to the internal combustion engine 7 by a clutch 8. The driving toothed gear of the first gear and the third gear (the first driving toothed gear 9) and the driving toothed gear of the second gear and the fourth gear (the second driving toothed gear 10) are fixedly arranged in a listed sequence from a side of the input shaft 14 towards the internal combustion engine 7 to a side of the input shaft 14 away from the internal combustion engine 7. The first main reduction toothed gear 1, the driven toothed gear of the first gear (the first driven toothed gear 2), the first two-way synchronizer 3 and the driven toothed gear of the second gear (the second driven toothed gear 4) are arranged in a listed sequence from a side of the first intermediate shaft 16 towards the internal combustion engine 7 to a side of the first intermediate shaft 16 away from the internal combustion engine 7. The second main reduction toothed gear 18, the driven toothed gear of the third gear (the third driven toothed gear 19), the second two-way synchronizer 20, the driven toothed gear of the fourth gear (the fourth driven toothed gear 21) and the driven toothed gear 24 of the first gear of the electric motor are arranged in a listed sequence from a side of the second intermediate shaft 25 towards the internal combustion engine 7 to a side of the second intermediate shaft 25 away from the internal combustion engine 7. The third intermediate shaft 31 is connected to the electric motor 33 for transmission, and is provided with the driving toothed gear 30 of the first gear. The output shaft is provided with a differential 27, a differential toothed gear 17 of the differential 27 can engage with the first main reduction toothed gear 1 and the second main reduction toothed gear 18.

In the hybrid power driving system, four gears using the internal combustion engine 7 as power source and one gear using the electric motor 33 as the power source are included, and the above description of the first gear, the second gear, the third gear, the four gear and the first gear of the electric motor are for distinguishing the gears, but not for limiting the specific structure of the gears.

A power transmission path of the gears is specifically described as follows:

The first gear of the internal combustion engine: the first two-way synchronizer 3 on the first intermediate shaft 6 is actuated to engage with the driven toothed gear of the first gear sleeved on the first intermediate shaft 6, and the clutch 8 is closed. The power outputted by the internal combustion engine 7 passes through the input shaft 14, the driving toothed gear of the first gear and the third gear, the driven toothed gear of the first gear, the first intermediate shaft 6, the first main reduction toothed gear 1 and the differential toothed gear 17 in a listed sequence, and then is outputted via the differential 27 and finally via the output shaft 26.

The second gear of the internal combustion engine: the first two-way synchronizer 3 on the first intermediate shaft 6 is actuated to engage with the driven toothed gear of the second gear sleeved on the first intermediate shaft 6, the clutch 8 is closed, the power outputted by the internal combustion engine 7 passes through the input shaft 14, the driving toothed gear of the second gear and the fourth gear, the driven toothed gear of the second gear, the first intermediate shaft 6, the first main reduction toothed gear 1 and the differential toothed gear 17 in a listed sequence, and then is outputted via the differential 27 and finally via the output shaft 26.

The third gear of the internal combustion engine: the second two-way synchronizer 3 on the second intermediate shaft 25 is actuated to engage with the driven toothed gear 19 of the third gear sleeved on the second intermediate shaft 25, the clutch 8 is closed, the power outputted by the internal combustion engine 7 passes through the input shaft 14, the driving toothed gear of the first gear and the third gear, the driven toothed gear of the third gear, the second intermediate shaft 25, the second main reduction toothed gear 18 and the differential toothed gear 17 in a listed sequence, and then is outputted via the differential 27 and finally via the output shaft.

The fourth gear of the internal combustion engine: the second two-way synchronizer 3 on the second intermediate shaft 25 is actuated to engage with the driven toothed gear 19 of the third gear sleeved on the second intermediate shaft 25, the clutch 8 is closed, the power outputted by the internal combustion engine 7 passes through the input shaft 14, the driving toothed gear of the second gear and the fourth gear, the driven toothed gear of the fourth gear, the second intermediate shaft 25, the second main reduction toothed gear 18 and the differential toothed gear 17 in a listed sequence, and then is outputted via the differential 27 and finally via the output shaft 26.

The power transmission path of the first gear of the electric motor: the power outputted by the electric motor 33 passes through the third intermediate shaft 31, the driving toothed gear 30 of the first gear of the electric motor, the driven toothed gear 24 of the first gear of the electric motor, the second intermediate shaft 25, the second main reduction toothed gear 18 and the differential toothed gear 17 in a listed sequence, and then is outputted via the differential 27 and finally via the output shaft 26.

When the internal combustion engine 7 and the electric motor 33 are used as the hybrid power source, based on the power transmission path of the first gear of the electric motor, one of the power transmission routes of the first gear, the second gear, the third gear and the fourth gear is coupled, which can achieve the four hybrid power operating conditions of the advancing of the vehicle.

In one embodiment, the requirements of being driven simply by internal combustion engine, simply by the electric motor and by hybrid power can be satisfied. Herein, only one electric motor 33 is set as the electric power source, therefore the cost is low, and the over volume of the hybrid power driving system can be reduced in the case of meeting the requirements of the gears, and further the space occupied by the hybrid power driving system can be reduced, thus facilitating the mounting of the hybrid power driving system of the vehicle. Meanwhile, by the alternate operating of the electric motor 33 and the internal combustion engine 7 and the opening and closing control of the clutch 8, the gears can be switched freely, and the power interruption problem during the gear switching process can be effectively avoided. Meanwhile, the number of the gears is large, the driving efficiency of the internal combustion engine 7 and the electric motor 33 are high, the power match between the multiple gears is better, and thus the power performance and the fuel economy of the whole vehicle can be improved.

In this embodiment, in case of being driven simply by the electric motor, the power transmission path of the reverse gear is the same as that of the first gear of the electric motor, just the electric motor is controlled to rotate reversely. While in case of being driven simply by the internal combustion engine, the reverse gear function can be realized by the following two technical solutions.

The first solution: as shown in FIG. 1, the first synchronizer and the reverse gear driving toothed gear 13 are provided on the input shaft 14, the first synchronizer (a component of the two-way synchronizer 12 at the right side in FIG. 1) can engage with the reverse gear driving toothed gear 13, and the reverse gear driving toothed gear 13 can engage with the driving toothed gear 30 of the first gear of the electric motor; and the reverse gear in this solution is that: the first synchronizer on the input shaft 14 is actuated to engage with the reverse gear driving toothed gear 13 sleeved on the input shaft 14, the power outputted by the internal combustion engine 7 passes through the input shaft 14, the reverse gear driving toothed gear 13, the driving toothed gear 30 of the first gear of the electric motor, the driven toothed gear 24 of the first gear of the electric motor, the second intermediate shaft 25, the second main reduction toothed gear 18 and the differential toothed gear 17 in a listed sequence, and then is outputted via the differential 27 and finally via the output shaft 26.

The second solution: referring to FIGS. 2 to 4, the hybrid power driving system further includes a reverse gear idle toothed gear shaft 15 and an idle toothed gear 16 arranged on the reverse gear idle toothed gear shaft 15, and the first synchronizer (which is indicated by reference numeral 35 in FIG. 2) and the reverse gear driving toothed gear 13 are provided on the input shaft 14, the idle toothed gear 16 engages with the reverse gear driving toothed gear 13 and the driven toothed gear 24 of the first gear of the electric motor respectively; and the reverse gear in this solution is that: the first synchronizer on the input shaft 14 is actuated to engage with the reverse gear driving toothed gear 13 sleeved on the input shaft 14, the power outputted by the internal combustion engine 7 passes through the input shaft 14, the reverse gear driving toothed gear 13, the idle toothed gear 16 arranged on the reverse gear idle toothed gear shaft 15, the driven toothed gear 24 of the first gear of the electric motor, the second intermediate shaft 25, the second main reduction toothed gear 18 and the differential toothed gear 17 in a listed sequence, and then is outputted via the differential 27 and finally via the output shaft 26.

In both of the above two technical solutions, the power is transmitted from the reverse gear driving toothed gear 13 to the driven toothed gear 24 of the first gear of the electric motor and is further transmitted to the second intermediate shaft 25, thus achieving the reverse gear function. Specifically, in the first solution, the reverse gear is achieved simply by engaging the reverse gear driving toothed gear 13 on the input shaft 14 with the driving toothed gear 30 of the first gear of the electric motor and further by engaging the driving toothed gear 30 of the first gear of the electric motor with the driven toothed gear 24 of the first gear of the electric motor. Compared with the second solution, the overall structure is simple. In the second solution, by arranging the reverse gear idle toothed gear shaft 15 and the idle toothed gear 16, the power transmission between the driving toothed gear 13 and the driven toothed gear 24 of the first gear of the electric motor is realized, and further the reverse gear of the vehicle is realized. Compared with the first solution, the requirements on the arrangement space of the reverse gear driving toothed gear 13 and the driving toothed gear 30 of the first gear of the electric motor, that is, the relative space position of the input shaft 14 and the third intermediate shaft 31 is reduced. The reverse gear function in case of being driven by the internal combustion engine can be achieved by both of the first solution and the second solution, one of which can be specifically selected according to the needs.

In case of using the internal combustion engine 7 and the electric motor 33 as the hybrid power source, based on the power transmission path of the reverse gear purely driven by the electric motor, the power transmission path of the reverse gear purely by the internal combustion engine can be coupled to realize the hybrid condition of the reverse of the vehicle.

In addition, by the interaction between the internal combustion engine 7 and the electric motor 33, the hybrid power driving system of the vehicle may include an idle charging operating mode, a driving charging operating mode and an internal combustion engine starting operating mode.

The idle charging operating mode: when the battery has a low electric quantity, the internal combustion engine 7 may provide power to the electric motor 33 and drives the electric motor 33 to charge the battery reversely; the first synchronizer on the input shaft 14 is actuated to engage with the reverse gear driving toothed gear 13, the clutch 8 is closed, the power outputted by the internal combustion engine 7 passes through the input shaft 14, the reverse gear driving toothed gear 13, the driving toothed gear 30 of the first gear of the electric motor (the power is transmitted from the reverse gear driving toothed gear 13 to the driving toothed gear 30 of the first gear of the electric motor directly or via the idle toothed gear 16 and the driven toothed gear 24 of the first gear of the electric motor), and the third intermediate shaft 31, and then finally is transmitted to the electric motor 33 to charge the battery thereof reversely.

The driving charging operating mode: during the driving process, when the battery has a low electric quantity, the internal combustion engine 7 may provide power to the electric motor 33 and drives the electric motor 33 to charge the battery reversely; and the driving charging in the hybrid power operating mode can be achieved by switching the gears. Taking the first gear of the internal combustion engine and the first gear of the electric motor as an example, the first two-way synchronizer 3 on the first intermediate shaft 6 is actuated to engage with the driven toothed gear of the first gear sleeved on the first intermediate shaft 6, the clutch 8 is closed, the power outputted by the internal combustion engine 7 passes through the input shaft 14, the driving toothed gear of the first gear and the first gear, the driven toothed gear of the first gear, the first intermediate shaft 6, the first main reduction toothed gear 1 and the differential toothed gear 17 in a listed sequence. One part of the power is outputted via the differential 27 and finally via the output shaft 26; and the other part of the power outputted by the internal combustion engine 7 passes through the second main reduction toothed gear 18, the second intermediate shaft 25, the driven toothed gear 24 of the first gear of the electric motor, the driving toothed gear 30 of the first gear of the electric motor, and the third intermediate shaft 31, and finally is transmitted to the electric motor 33 to charge the battery thereof reversely.

The operating mode of the electric motor 33 starting the internal combustion engine 7: when the vehicle is started or when the vehicle is switched from the operating mode of being driven simply by the electric motor to the hybrid power operating mode, the electric motor 33 can be used as the starting electric motor of the internal combustion engine 7. By switching the gears, the internal combustion engine 7 can be started by the gears of the electric motor 33 and the gears of the internal combustion engine 7. Taking the first gear of the internal combustion engine and the first gear of the electric motor as example, the first two-way synchronizer 3 on the first intermediate shaft 6 is actuated to engage with the driven toothed gear of the first gear sleeved on the first intermediate shaft 6, the clutch 8 is closed, the power outputted by the electric motor 33 passes through the third intermediate shaft 31, the driving toothed gear 30 of the first gear of the electric motor, the driven toothed gear 24 of the first gear of the electric motor, the second intermediate shaft 25, the second main reduction toothed gear 18 and the differential toothed gear 17 in a listed sequence. One part of the power is outputted via the differential 27 and finally via the output shaft 26; and the other part of the power outputted by the first main reduction toothed gear 1, the first intermediate shaft 6, the driven toothed gear of the first gear, the driving toothed gear of the first gear and the third gear, the input shaft 14 and the clutch, and finally is transmitted to the internal combustion engine 7 to start the same.

Based on the above embodiments, the input shaft 14 may be provided with a driving toothed gear of a fifth gear (a third driving toothed gear 11). The intermediate shaft 6 or the second intermediate shaft 25 may be provided with a driven toothed gear of the fifth gear (a fifth driven toothed gear 5) fitted with the driving toothed gear of the fifth gear, that is to say, when the internal combustion engine 7 is used as the power source, there may be five gears, and in this case, the first synchronizer may be served as a component of a third two-way synchronizer 12, and the third two-way synchronizer 12 can engage with the driving toothed gear of the fifth gear or the reverse gear driving toothed gear 13 selectively. When the internal combustion engine 7 as the power source includes four gears, the first synchronizer may be a one-way synchronizer 35, which can engage with the reverse gear driving toothed gear 13.

The driven toothed gear of the fifth gear is arranged on the first intermediate shaft 6 or the second intermediate shaft 25, and in this embodiment, as shown in FIGS. 1, 3 and 4, taking the case of the driven toothed gear of the fifth gear being arranged on the first intermediate shaft 6 as an example, the third two-way synchronizer 12 on the input shaft 14 is actuated to engage with the driving toothed gear of the fifth gear sleeved on the input shaft 14, the clutch 8 is closed, the power outputted by the internal combustion engine 7 passes through the input shaft 14, the driving toothed gear of the fifth gear, the driven toothed gear of the fifth gear, the first intermediate shaft 6, the first main reduction toothed gear 1 and the differential toothed gear 17 in a listed sequence, and then is outputted via the differential 27 and finally via the output shaft 26.

In this case, the internal combustion engine 7 as the power source may include five gears; when the internal combustion engine 7 and the electric motor 33 serve as the hybrid power source, based on the power transmission path of the first gear of the electric motor, the power transmission path of one of the first gear to the fifth gear of the internal combustion engine is coupled, which may realize five operating modes of hybrid power of the advancing of the vehicle. Increased gears may achieve the power match of the internal combustion engine 7 and the electric motor 33 better, and thus the power performance and the fuel economy of the whole vehicle can be further improved.

In the above embodiment, the driven toothed gear 24 of the first gear of the electric motor can be set in the following two manners. One is that the driven toothed gear 24 of the first gear of the electric motor is a fixedly connected toothed gear fixedly arranged on the second intermediate shaft 25; and the other is that the driven toothed gear 24 of the first gear of the electric motor is a nested toothed gear sleeved on the second intermediate shaft 25, which may further be provided with a second synchronizer fixedly connected to the nested toothed gear. The first setting manner can simplify the overall structure, the second setting manner is flexible, and both of the setting manners can achieve the power transmission of the first gear of the electric motor.

The second setting manner as described above is flexible, and based on this, the third intermediate shaft 31 may further be provided with a driving toothed gear 29 of the second gear of the electric motor, and correspondingly, the second intermediate shaft 25 is provided with a driven toothed gear 22 of a second gear of the electric motor. In this case, the second synchronizer is a component of a fourth two-way synchronizer 23, which is located between the driven toothed gear 24 of the first gear of the electric motor and the driven toothed gear 22 of the second gear of the electric motor. That is to say, pure electric driving includes two gears, as shown in FIGS. 1, 2 and 4, the fourth two-way synchronizer 23 on the second intermediate shaft 25 is actuated to engage with the driven toothed gear 24 of the first gear of the electric motor sleeved on the second intermediate shaft 25, and the power transmission path is described above. For the second gear of the electric motor, the fourth two-way synchronizer 23 on the second intermediate shaft 25 is actuated to engage with the driven toothed gear 22 of the second gear of the electric motor sleeved on the second intermediate shaft 25, and the power outputted by the electric motor 33 passes through the third intermediate shaft 31, the driving toothed gear 29 of the second gear of the electric motor, a driven toothed gear 22 of the second gear of the electric motor, the second intermediate shaft 25, the second main reduction toothed gear 18 and the differential toothed gear 17, and then is outputted via the differential 17 and is finally outputted via the output shaft 26.

In this case, the electric motor 33 as the power source may include two gears, when the internal combustion engine 7 and the electric motor 33 being as the hybrid power source, based on the power transmission path of the first gear of the electric motor and the power transmission path of the second gear of the electric motor, the power transmission path of the gears of the internal combustion engine are coupled, which may achieve eight (when the simply internal combustion engine driving has four gears) or ten (when the simply internal combustion engine driving has five gears) hybrid power transmission operating modes of the advancing of the vehicle. Increased gears may achieve the power match of the internal combustion engine 7 and the electric motor 33 better, and thus the power performance and the fuel economy of the whole vehicle can be further improved.

In this embodiment, in case of the pure electric motor driving, the reverse gear may also has the same power transmission path as the second gear of the electric motor, and just the electric motor 33 is controlled to rotate reversely. That is, two reverse gears in case of pure electric motor driving can both be coupled with the power transmission path of the reverse gear of the internal combustion engine to achieve the two hybrid power operating modes of the reverse of the vehicle.

In the case that the internal combustion engine 7 as power source includes five gears and the electric motor 33 as power source includes two gears, the driven toothed gear of the fifth gear may be arranged on the first intermediate shaft 6.

In the above embodiments, the output shaft 26 and the differential toothed gear 17 or the output shaft gear is permanently connected. It is also possible that the differential toothed gear 17 or the output shaft gear constitutes as a nested gear and is fitted with a synchronizer. For example, when the internal combustion engine 7 drives the electric motor 33 via the differential toothed gear 17 or the output shaft gear to generate electricity, the synchronizer is disengaged, and the output shaft 26 is not driven by the internal combustion engine 7. When the electric motor 33 drives the input shaft via the differential toothed gear 17 or the output shaft gear and thus starts the internal combustion engine 7, the synchronizer is disengaged, therefore the electric motor 33 may not undertake the task of driving the vehicle at the same time.

Figure 6:
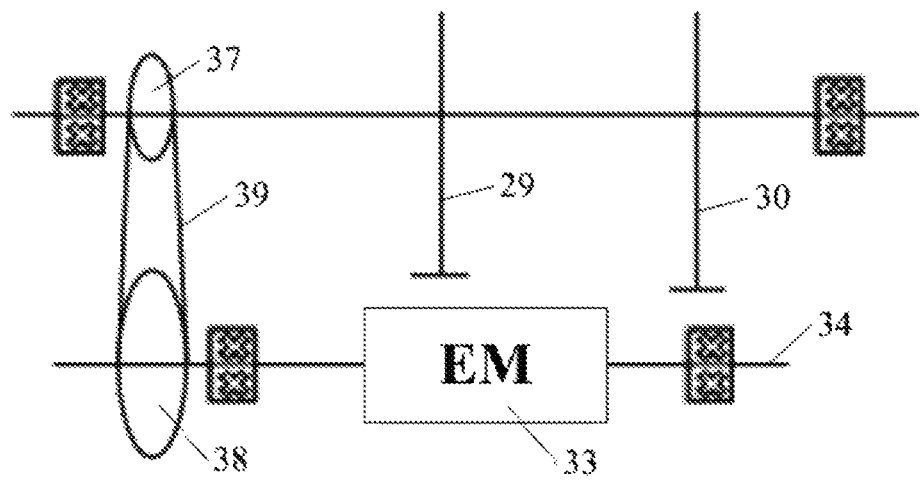
FIG. 6 is a schematic view of the structure of a third intermediate shaft and an electric motor being transmitted via a chain wheel in a hybrid power driving system according to one embodiment of the present application.

In the above embodiments, the third intermediate shaft 31 is connected to the electric motor 33 for transmission, and specifically may be connected by gear or chain. For example, as shown in FIGS. 1-4, the rotor shaft 34 of the electric motor 33 is provided with a first transmission toothed gear 32, the third intermediate shaft 31 is provided with a second transmission toothed gear 28 fitted with the first transmission toothed gear 32, and the rotor shaft 34 of the electric motor 33 is connected to the third intermediate shaft 31 by gear engagement for transmission. The power of the electric motor 33 passes through the rotor shaft 34, the first transmission toothed gear 32 and the second transmission toothed gear 28 in a listed sequence, and then is transmitted to the third intermediate shaft 31. For example, as shown in FIG. 5, the electric motor 33 may be connected to the third intermediate shaft 31 via more transmission toothed gears for transmission. For example, as shown in FIG. 6, the rotor shaft 34 of the electric motor 33 is provided with a first driving chain wheel 38, the third intermediate shaft is provided with a second driving chain wheel 37, and the transmission connection between the rotor shaft 34 of the electric motor 33 and the third intermediate shaft 31 are achieved by the first driving chain wheel 38 and the second driving chain wheel 37 connected by a chain. In this case, the power of the electric motor passes through the rotor shaft 34, the first driving chain wheel 38 and the second driving chain wheel 37, and is transmitted to the third intermediate shaft 34. While in the charging operating mode, the power is transmitted from the third intermediate shaft 31 to the electric motor reversely to charge the battery.

Figure 7:
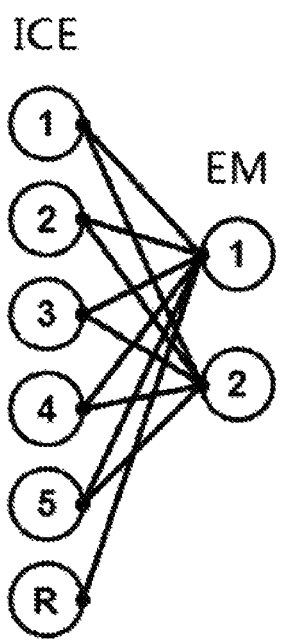
FIG. 7 is an abbreviated drawing of a hybrid drive gear combination according to an embodiment of the present application.

FIG. 7 is an abbreviated drawing of a hybrid drive gear combination according to an embodiment of the present application. In FIG. 7, the mark of ICE represents the internal combustion engine or the engine 7, and the mark of EM represents the electric motor 33. Herein, the internal combustion engine 7 may include five forward gears, i.e. the first gear to the fifth gear and one reverse gear, and the electric motor 33 may include two electric motor gears. Each connection line indicates a combination of one gear of the internal combustion engine and one gear of the electric motor. As may be seen from FIG. 7, any one gear of the internal combustion engine can be combined with any one gear of the electric motor, thus there are ten hybrid driving modes and two hybrid reverse gear modes in total. It is an understood thing that any combination of other number of gears of the internal combustion engine and other number of gears of the electric motor can also be considered.

The embodiments described hereinabove are only embodiments of the present application. It should be understood by the skilled in the art that, a plurality of variations and modifications may be made to the technical solution of the present application based on the above disclosed technical contents without departing from the principle of the present application, and these variations and modifications are also deemed to fall into the protection scope of the present application.

What is claimed is:

1. A gear box of a hybrid power vehicle, comprising:
a first gear box part, and
a second gear box part,
wherein the first gear box part comprises four forward gears comprising a first gear to a fourth gear, or comprises fifth forward gears comprising a first gear to a fifth gear, and all the forward gears are switchable by selectively closing a plurality of synchronizers;
the first gear box part comprises just one input shaft and two intermediate shafts, the input shaft is configured to be connected to an internal combustion engine for transmission, a first driving toothed gear and a second driving toothed gear are provided on the input shaft, a first driven toothed gear engageable with the first driving toothed gear and a second driven toothed gear engageable with the second driving toothed gear are provided on a first intermediate shaft of the two intermediate shafts, a third driven toothed gear engageable with the first driving toothed gear and a fourth driven toothed gear engageable with the second driving toothed gear are provided on a second intermediate shaft of the two intermediate shafts, the first driven toothed gears to the fourth driven toothed gears are respectively nested toothed gears and form one of the four forward gears or five forward gears together with the respective driving toothed gears,
in case of the five forward gears, another gear other than the four forward gear is formed by a third driving toothed gear on the input shaft and a fifth driven toothed gear on the first intermediate shaft or the second intermediate shaft, a first main reduction toothed gear is provided on the first intermediate shaft, and a second main reduction toothed gear is provided on the second intermediate shaft, the first main reduction toothed gear and the second main reduction toothed gear are coupled with a common output shaft; and
the second gear box part comprises a third intermediate shaft and one intermediate shaft of the two intermediate shafts, the third intermediate shaft is configured to be connected to an electric motor for transmission, a driving toothed gear of a first gear of the electric motor is provided on the third intermediate shaft, and a driven toothed gear of the first gear of the electric motor is provided on the one intermediate shaft;
wherein the input shaft, the first intermediate shaft, the second intermediate shaft and the third intermediate shaft are parallelly staggered,
wherein the first gear box part has a reverse gear,
wherein the input shaft is provided with a reverse gear driving toothed gear, the first intermediate shaft or the second intermediate shaft is provided with a reverse gear driven toothed gear, and the reverse gear driving toothed gear is connected to the reverse driven gear via an intermediate toothed gear for transmission, wherein the intermediate toothed gear is a driving toothed gear of a gear of the electric motor, and the reverse gear driven toothed gear is a driven toothed gear of the gear of the electric motor; or the intermediate toothed gear is an idle toothed gear, and the reverse gear driven toothed gear is a driven toothed gear of the gear of the electric motor.

2. The gear box of the hybrid power vehicle according to claim 1, wherein the first driving toothed gear is a fixedly connected toothed gear or a nested toothed gear; and/or the second driving toothed gear is a fixedly connected toothed gear or a nested toothed gear.

3. The gear box of the hybrid power vehicle according to claim 1, wherein a synchronizer for the first driven toothed gear and a synchronizer for the second driven toothed gear constitute as a first two-way synchronizer located on the first intermediate shaft between the first driven toothed gear and the second driven toothed gear; and/or a synchronizer for the third driven toothed gear and a synchronizer for the fourth driven toothed gear constitute as a second two-way synchronizer located on the second intermediate shaft between the third driven toothed gear and the fourth driven toothed gear.

4. The gear box of the hybrid power vehicle according to claim 1, wherein in case of the five forward gears, the third driving toothed gear and the fifth driven toothed gear form the first gear, the second gear, the third gear, the fourth gear or the fifth gear.

5. The gear box of the hybrid power vehicle according to claim 1, wherein the first driving toothed gear and the second driven toothed gear form the first gear, the first driving toothed gear and the third driven toothed gear form the third gear, the second driving toothed gear and the second driven toothed gear form the second gear, and the second driving toothed gear and the fourth driven toothed gear form the fourth gear.

6. The gear box of the hybrid power vehicle according to claim 1, wherein in case of the five forward gears, the first driving toothed gear and the second driving toothed gear are arranged in a listed sequence or in an inverted sequence on the input shaft from a side towards the internal combustion engine and a side away from the internal combustion engine; and the third driving toothed gear is arranged on the side towards the internal combustion engine or away from the internal combustion engine relative to the first driving toothed gear and the second driving toothed gear.

7. The gear box of the hybrid power vehicle according to claim 1, wherein the input shaft is configured to be connected to the internal combustion engine via a clutch or a hydraulic torque converter for transmission.

8. The gear box of the hybrid power vehicle according to claim 1, wherein a differential is integrated into the gear box, and the first main reduction toothed gear and the second main reduction toothed gear engage with a differential toothed gear of the differential; or the input shaft is configured to be connected to a main speed reducer or the differential via a transmission shaft for transmission.

9. The gear box of the hybrid power vehicle according to claim 1, wherein the electric motor is integrated into the gear box.

10. The gear box of the hybrid power vehicle according to claim 1, wherein the gear of the electric motor is a first gear or a second gear of the electric motor.

11. The gear box of the hybrid power vehicle according to claim 1, wherein in case of the five forward gears, the third driving toothed gear is a nested toothed gear, the reverse gear driving toothed gear is a nested toothed gear, a synchronizer for the third driving toothed gear and a synchronizer for the reverse gear driving toothed gear form a third two-way synchronizer located on the input shaft between the third driving toothed gear and the reverse gear driving toothed gear.

12. The gear box of the hybrid power vehicle according to claim 1, wherein a driving toothed gear of a second gear of the electric motor is provided on the third intermediate shaft, and the one intermediate shaft is provided with a second gear driven toothed gear of the electric motor.

13. The gear box of the hybrid power vehicle according to claim 12, wherein the driven toothed gear of the first gear of the electric motor and the second driven toothed gear of the second gear of the electric motor are respectively nested toothed gears, and a synchronizer for the driven toothed gear of the first gear of the electric motor and a synchronizer for the driven toothed gear of the second gear of the electric motor form a fourth two-way synchronizer on the one intermediate shaft between the driven toothed gear of the first gear of the electric motor and the driven toothed gear of the second gear of the electric motor.

14. The gear box of the hybrid power vehicle according to claim 1, wherein in case of the five forward gears, with reference to an axis of the input shaft, one driving toothed gear of the gear of the electric motor and the third driving toothed gear are arranged on a same axial position.

15. The gear box of the hybrid power vehicle according to claim 1, wherein with reference to an axis of the input shaft, one driving toothed gear of the gear of the electric motor and a reverse gear driving toothed gear are arranged on a same axial position.

16. The gear box of the hybrid power vehicle according to claim 1, wherein with reference to an axis of the input shaft, the gear of the electric motor is arranged on a side towards the internal combustion engine, while the forward gears are arranged on a side away from the internal combustion engine; or, the forward gears are arranged on a side towards the internal combustion engine, and the gear of the electric motor is arranged on a side away from the internal combustion engine.

17. The gear box of the hybrid power vehicle according to claim 1, wherein a rotor shaft of the electric motor is parallel staggered relative to any one of the input shaft, the first intermediate shaft, the second intermediate shaft and the third intermediate shaft.

18. The gear box of the hybrid power vehicle according to claim 1, wherein the gear box is configured to operate in any of the following operating modes:

an internal combustion engine driving mode, wherein only the input shaft is driven by the internal combustion engine;

a pure electric mode, wherein only one electric gear is driven by the electric motor;

a hybrid drive mode, wherein not only the input shaft is driven by the internal combustion engine, but also one electric gear is driven by the electric motor;

a charging mode, wherein the electric motor is driven by the input shaft;

an internal combustion engine starting mode, wherein the input shaft is driven by the electric motor; and a reverse gear mode, comprising a reverse gear mode simply by the internal combustion engine, a reverse gear mode simply by the electric motor, and a hybrid gear mode by both the internal combustion engine and the electric motor.

19. The gear box of the hybrid power vehicle according to claim 18, wherein the hybrid drive mode is achieved by any forward gear and any gear of the electric motor.

20. The gear box of the hybrid power vehicle according to claim 18, wherein the charging mode comprises:
an idle charging operating mode, wherein a power transmission path from the input shaft to the electric motor comprises a reverse gear driving toothed gear and a driving toothed gear of one gear of the electric motor; and
a driving charging operating mode, wherein the power transmission path from the input shaft to the electric motor comprises a driving toothed gear and a driven toothed gear of one forward gear, the first main reduction toothed gear and the second main reduction toothed gear, and a driven toothed gear and a driving toothed gear of one gear of the electric motor.

21. The gear box of the hybrid power vehicle according to claim 1, wherein
in case of the five forward gears, the driving toothed gear of the first gear and the third gear as the first driving toothed gear and the driving toothed gear of the second gear and the fourth gear as the second driving toothed gear are fixedly arranged in a listed sequence from a side of the input shaft towards the internal combustion engine to a side of the input shaft away from the internal combustion engine;
the first main reduction toothed gear, the driven toothed gear of the first gear as the first driven toothed gear, a first two-way synchronizer and the driven toothed gear of the second gear as the second driven toothed gear are arranged in a listed sequence from a side of the first intermediate shaft towards the internal combustion engine to a side of the first intermediate shaft away from the internal combustion engine;
the second main reduction toothed gear, the driven toothed gear of the third gear as the third driven toothed gear, a second two-way synchronizer, the driven toothed gear of the fourth gear as the fourth driven toothed gear and the driven toothed gear of the first gear of the electric motor are arranged in a listed sequence from a side of the second intermediate shaft towards the internal combustion engine to a side of the second intermediate shaft away from the internal combustion engine;
the third intermediate shaft is connected to the electric motor for transmission, and is provided with the driving toothed gear of the first gear of the electric motor; and
the output shaft is provided with a differential, a differential toothed gear of the differential engages with the first main reduction toothed gear and the second main reduction toothed gear respectively.

22. The gear box of the hybrid power vehicle according to claim 21, wherein the input shaft is further provided with a first synchronizer and a reverse gear driving toothed gear, the first synchronizer is engageable with the reverse gear driving toothed gear, which engages with the driving toothed gear of the first gear of the electric motor.

23. The gear box of the hybrid power vehicle according to claim 22, wherein the input shaft is further provided with a driving toothed gear of the fifth gear as the third driving toothed gear, the first synchronizer is a component of a third two-way synchronizer, which is engageable with the driving toothed gear of the fifth gear or the reverse gear driving toothed gear;
the first intermediate shaft or the second intermediate shaft is provided with a driven toothed gear of the fifth gear as a fifth driven toothed gear fitted with the driving toothed gear of the fifth gear.

24. The gear box of the hybrid power vehicle according to claim 21, wherein the gear box further comprises an idle toothed gear shaft of a reverse gear and an idle toothed gear provided on the idle toothed gear shaft of the reverse gear, and the input shaft is further provided with a first synchronizer and a reverse gear driving toothed gear; and
the idle toothed gear engages with the reverse gear driving toothed gear and the driven toothed gear of the first gear of the electric motor respectively.

25. The gear box of the hybrid power vehicle according to claim 21, wherein the driven toothed gear of the first gear of the electric motor is a fixedly connected toothed gear fixedly arranged on the second intermediate shaft; and
the driven toothed gear of the first gear of the electric motor is a nested toothed gear sleeved on the second intermediate shaft, and the second intermediate shaft is provided with a second synchronizer for the driven toothed gear of the first gear.

26. The gear box of the hybrid power vehicle according to claim 25, wherein the third intermediate shaft is further provided with a driving toothed gear of a second gear of the electric motor, and the second intermediate shaft is provided with a driven toothed gear of the second gear of the electric motor of the nested gear; and
the second synchronizer is a component of a fourth two-way synchronizer, and the fourth two-way synchronizer is located between the driven toothed gear of the first gear and the driven toothed gear of the second gear of the electric motor.

27. The gear box of the hybrid power vehicle according to claim 21, wherein the third intermediate shaft is connected to the electric motor by a gear wheel or a chain wheel for transmission.

28. The gear box of the hybrid power vehicle according to claim 1, wherein
in case of the five forward gears, a reverse gear driving toothed gear formed as the nested toothed gear, a third two-way synchronizer, a driving toothed gear of the fifth gear formed as the nested toothed gear as the third driving toothed gear, a driving toothed gear of the first gear and the third gear as the first driving toothed gear, and a driving toothed gear of the second gear and the fourth gear as the second driving toothed gear are arranged in a listed sequence from a side of the input shaft towards the internal combustion engine to a side of the input shaft away from the internal combustion engine;
a first main reduction toothed gear, a driven toothed gear of a second gear of the electric motor, a driven toothed gear of the second gear, a fourth two-way synchronizer, a driven toothed gear of the second gear of the electric motor, a driven toothed gear of the first gear as the first driven toothed gear, a first two-way synchronizer, and a driven toothed gear of the second gear as the second driven toothed gear are arranged in a listed sequence from a side of the first intermediate shaft towards the internal combustion engine to a side of the first intermediate shaft away from the internal combustion engine;

the second main reduction toothed gear, a driven toothed gear of the fifth gear as a fifth driven toothed gear, a driven toothed gear of the third gear as the third driven toothed gear, a second two-way synchronizer and a driven toothed gear of the fourth gear of the electric motor as the fourth driven toothed gear are arranged in a listed sequence from a side of the second intermediate shaft towards the internal combustion engine to a side of the second intermediate shaft away from the internal combustion engine;

the third intermediate shaft is connected to the electric motor for transmission, and is provided with the driving toothed gear of the first gear of the electric motor and the driving toothed gear of the first gear in a listed sequence from a side of the third intermediate shaft towards the internal combustion engine to a side of the third intermediate shaft away from the internal combustion engine; and the output shaft is provided with a differential, a differential toothed gear of the differential engage with the first main reduction toothed gear and the second main reduction toothed gear.

29. A hybrid power driving system, comprising an internal combustion engine and an electric motor, wherein the hybrid power driving system further comprises the gear box according to claim 1.

30. A hybrid power drive vehicle, comprising the hybrid power driving system according to claim 29.

\* \* \* \* \*